(12) United States Patent
Tatarczyk

(10) Patent No.: US 7,551,775 B2
(45) Date of Patent: Jun. 23, 2009

(54) METHOD FOR EVALUATING AN IMAGE OF A PREDETERMINED EXTRACT OF A PRINTED PRODUCT

(75) Inventor: Theodor Tatarczyk, Gröbenzell (DE)

(73) Assignee: manroland AG, Offenbach am Main (DE)

( * ) Notice: Subject to any disclaimer, the term of this patent is extended or adjusted under 35 U.S.C. 154(b) by 314 days.

(21) Appl. No.: 11/042,891

(22) Filed: Jan. 25, 2005

(65) Prior Publication Data

US 2006/0001925 A1    Jan. 5, 2006

(30) Foreign Application Priority Data

Jan. 25, 2004    (DE) .................. 10 2004 003 612

(51) Int. Cl.
| | |
|---|---|
| G06K 9/00 | (2006.01) |
| G03F 3/08 | (2006.01) |
| H04N 1/46 | (2006.01) |
| H04N 17/00 | (2006.01) |
| H04N 17/02 | (2006.01) |

(52) U.S. Cl. .................. 382/167; 358/518; 358/516; 348/175

(58) Field of Classification Search ............... 382/112; 250/559, 571; 358/516, 518; 348/175
See application file for complete search history.

(56) References Cited

U.S. PATENT DOCUMENTS 4,972,496 A * 11/1990 Sklarew .................. 382/187
5,724,259 A * 3/1998 Seymour et al. ............ 382/199
5,850,472 A 12/1998 Alston et al.
6,540,891 B1 * 4/2003 Stewart et al. .......... 204/403.14

FOREIGN PATENT DOCUMENTS

| DE | 195 38 811 C2 | 11/1996 |
|---|---|---|
| DE | 102 18 068 A1 | 11/2002 |
| EP | 0 741 032 B1 | 11/1996 |
| EP | 1 166 061 B1 | 5/2003 |

\* cited by examiner

*Primary Examiner*—Matthew C Bella
*Assistant Examiner*—Randolph Chu
(74) *Attorney, Agent, or Firm*—Leydig, Voit & Mayer, Ltd.

(57) ABSTRACT

A method for evaluating an image of a predetermined extract of a printed product makes corrections to a white reference to account for spatial variations and changes of illumination intensity over time. Intensity signals recorded from first predetermined areas within the extract are combined arithmetically with reference data values that represent a measure of the intensity of the light reflection from unprinted regions of the printed product. At the start, an image of a white reference is recorded and basic reference data for the entire extract are derived from the intensity signals of this image. During each evaluation of an image of the predetermined extract, correction data are derived from intensity signals recorded from second predetermined areas within the extract. Before the intensity signals recorded from the first predetermined areas within the predetermined extract are arithmetically combined with the reference data, the latter are determined by means of an arithmetic combination of the basic reference data with the correction data.

11 Claims, 2 Drawing Sheets

METHOD FOR EVALUATING AN IMAGE OF A PREDETERMINED EXTRACT OF A PRINTED PRODUCT

FIELD OF THE INVENTION

The invention relates to a method for evaluating an image of a predetermined extract of a printed product, and more particularly to a method for evaluating an image that makes corrections for spatial and time-dependent variations of illumination intensity.

BACKGROUND OF THE INVENTION

During a printing operation, for the purpose of process monitoring, it is usual to provide printed control strips with colored test patterns outside the subject on sheets or webs to be printed. These control strips, whose longitudinal direction is transverse with respect to the transport direction of the printing material, contain a set of measurement areas on each of which a specific characteristic variable characterizing the printing quality can be measured, and which are typically repeated periodically in the longitudinal direction but do not have to be.

A typical configuration is, for example, in the case of four-color printing, a sequence of measurement areas which are printed with the full-tone colors black, cyan, magenta and yellow, in order to permit a measurement of the respective ink density. By using such ink density measurements, conclusions about the ink supply in the inking unit of the press can be obtained, and its setting can be optimized when starting up the press but also during continuous operation.

For measurements of this type, it is known to arrange a measuring apparatus in a press which comprises a light source for illuminating the printed product, a camera aimed at the printed product for recording an image of an extract of the printed product, and an electronic evaluation unit. In this case, the aforementioned extract of the printed product has a control strip of the type mentioned previously. The camera has an electronic two-dimensional image sensor, from which the evaluation unit reads the images acquired and from these determines characteristic variables of the printed product, for example density values of the printed inks. Apparatuses of this type and methods for their operation are described in EP 0 741 032 B1 and DE 195 38 811 C2.

In such measurements, the intensity of the light reflected by a printed product always depends on the intensity of the light shone in by the illumination device. For this reason, there is always a need for appropriate equalization of the measuring device. For this purpose, the intensity of the reflections of the unprinted printing material, which is referred to as a "white reference" in the following text, is recommended as a reference variable. In the case of ink density measurements, the intensity of reflection from a printed area is in any case placed in a relationship with that of the unprinted printing material, so that the latter has to be acquired as a reference variable.

In a measurement on an elongated control strip, which extends over virtually the entire width of the printing material, inhomogeneities of the illumination and of the camera sensitivity over the length of the image to be acquired cannot be disregarded. In order to avoid measurement errors as a result of these inhomogeneities, a local white reference is necessary. One such method is taught by DE 195 38 811 C2 in the form of recording an image of an unprinted area with a size covering the dimensions of a control strip. However, faults arise in the event of variation of the illumination intensity over time. In this regard, the aforesaid document mentions as a countermeasure the use of unprinted areas within the control strip as a white reference but without making any statement as to how such a use is to be understood.

BRIEF SUMMARY OF THE INVENTION

In view of the foregoing, it is an object of the invention to specify a method for evaluating an image of a predetermined extract of a printed product in which faults as a result of both location and time fluctuations of the intensity of the illumination and/or of the sensitivity of the camera used for image recording can be compensated for with high accuracy.

This object is achieved by a method of the invention. In accordance with the invention, a location-dependent white reference is recorded at the start of operation, referred to as the basic reference in the following text, for the extract of a printed product having individual white reference areas within the extract. During continuous operation, at each evaluation of an image of the section considered, correction data are derived from the intensity signals from the white reference areas. With the aid of these correction data, the basic reference data assigned to the actual measuring areas and determined at the start of operation are corrected by means of arithmetic combination of the two data sets. These corrected reference data are then in turn combined arithmetically with the intensity signals from the actual measuring areas when evaluating the said intensity signals.

The basic reference can in this case be recorded by measuring an unprinted printing material, for example at the start of a print job before color is applied to the printing material, or a uniformly bright area on an object, such as a calibration tile, introduced temporarily into the observation region of the camera.

In this case, averaging the recorded light intensities over areas of predetermined size is advantageous both when determining the basic reference data and when determining the correction data, the area sizes for the averaging being given by the dimensions of the actual measuring areas or those of the white reference areas. This averaging over areas provides not only an improvement in the signal/noise ratio but also a reduction in the quantities of data to be processed. Each measuring area and each white reference area is assigned only a single basic reference data value after the averaging. Furthermore, during continuous operation after the averaging, each white reference field is assigned only a single correction data value.

In order to determine the corrected reference data, it is particularly useful to approximate the profiles in both of the basic reference data and of the correction data by an interpolation function in each of the image areas lying between the white reference areas. For these regions, for each basic reference data value, a corrected reference data value associated with the same location can be calculated by means of multiplication by the ratio of the two interpolation functions at that location with which the basic reference data value is associated. In this case, the ratio of the two interpolation functions should be formed in such a way that the corrected reference data values in the white reference areas in each case agree with the correction data values. By means of this method, correction of the basic reference data in the image regions lying between the white reference areas is effected while their basic physical profile shape is maintained. This is particularly advantageous, since maintaining the basic physical profile shape in this way is also to be expected during variations in time and/or location of the illumination and/or the sensor sensitivity.

Although the method according to the invention can in principle also be applied to two-dimensional arrangements of measuring areas, it is advantageous in the sense of needing little space on the printed product if all the areas are arranged continuously beside one another in the form of a strip, so that the basic reference data values and the reference data values in each case represent values of one-dimensional functions of a local variable.

Moreover, it is expedient if the white reference areas are arranged within the predetermined extract considered in accordance with a periodic pattern, for example equidistantly in a linear arrangement. In that case, the accuracy of the correction is the same over the entire extract and, during the interpolation, all the data sets to be processed have the same extent. Suitable interpolation functions are all functions known for this purpose in numerical mathematics but primarily polynomials up to the third order.

Exceeding a predetermined deviation between the basic reference data and the reference data is an indication that a malfunction, for example in the form of the total failure of a component, has occurred and requires rectification. In this case, it is useful to output an error message in order to draw the attention of the operating personnel to the problem.

A particularly important type of evaluation is the determination of density values of the printing inks used. For this purpose, the intensity signals recorded from the actual measuring areas within the extract considered are placed in a relationship with white reference data.

In the following text, an exemplary embodiment of the invention will be described by using the drawings, in which:

DETAILED DESCRIPTION OF THE INVENTION

Figure 1:
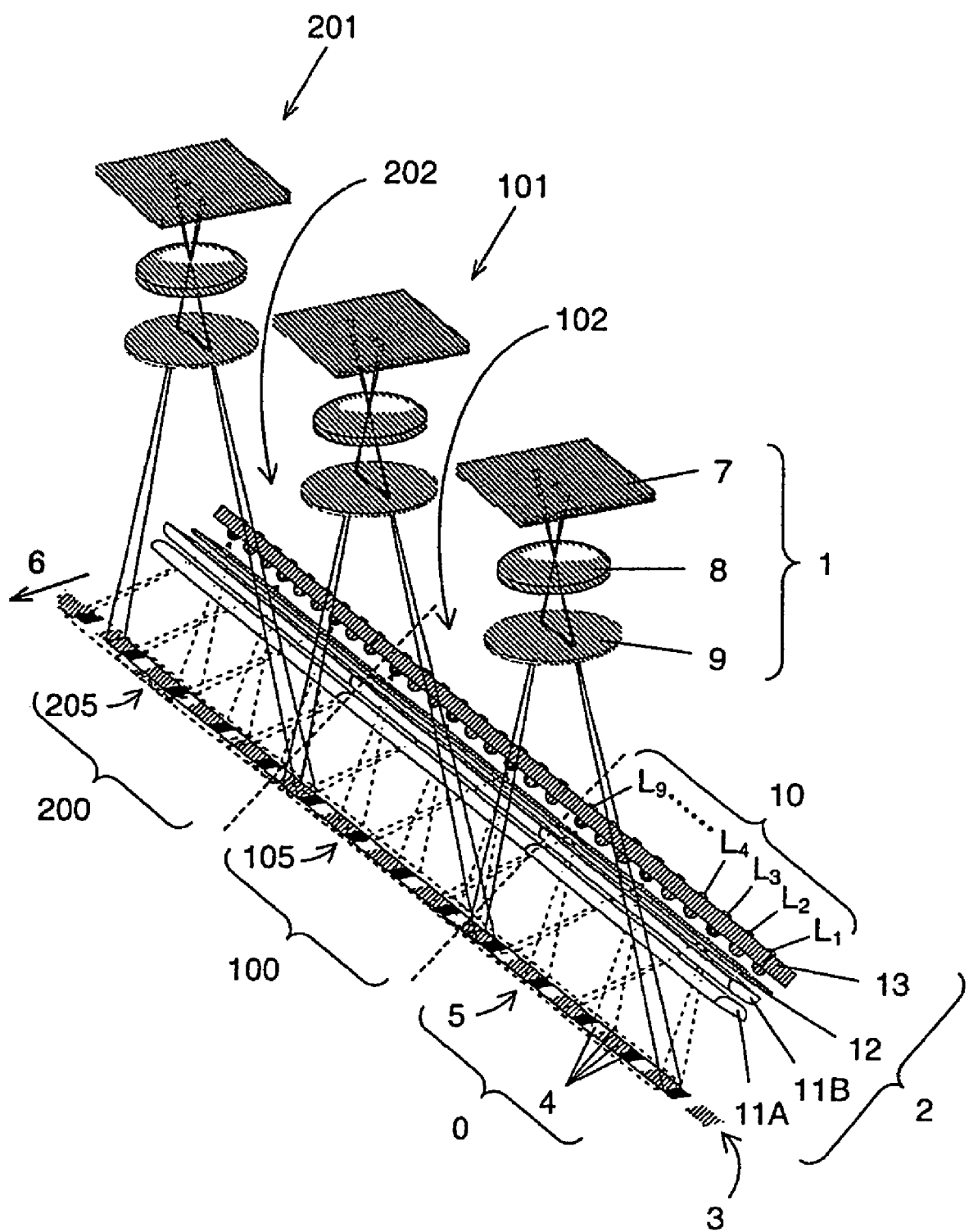
FIG. 1 shows a schematic three-dimensional view of a measuring apparatus, during whose operation the method according to the invention can be applied.

FIG. 1 shows in a simplified form a measuring apparatus, during whose operation the method according to the invention can be applied. The measuring apparatus includes an electronic camera 1 and an associated illumination device 2. In this case, a plurality of identical cameras 1, 101 and 201 and a plurality of illumination devices 2, 102 and 202 in each case assigned thereto are lined up in a row in a modular fashion. The entire apparatus is built into a press and is used for monitoring the printing process.

The camera 1 is intended to record an image of a predetermined extract of a printed product, for example of a controlled strip 3 having a large number of periodically repeating measuring areas 4, while the said strip is moving through an observation region 5 of the camera 1, which is likewise strip-like in this case and shown dashed in FIG. 1. The direction of movement of the control strip 3 is indicated in FIG. 1 by the arrow 6.

The camera 1 is a black and white camera having a two-dimensional image sensor 7. The image acquired by this comprises a rectangular matrix of image points, an electric signal which is a measure of the intensity of the incident light being output for each image point. For the purpose of reduced projection of the observation region 5 onto the image sensor 7, an objective 8 is provided. A polarization filter 9 can also be arranged in front of the objective 8. If the observation region 5 is a narrow elongated strip, then the entire active area of the rectangular image sensor, whose length/width ratio is usually not excessively large, is not needed to record the observation region 5, but likewise only a relatively narrow strip. In this case, following the recording of an image, only such a strip is also read from the image sensor 7. In addition, the beam path can be narrowed appropriately by parts of the housing of the camera 1, not illustrated in FIG. 1, so that light can get to the image sensor 7 only from the intended observation region 5.

In order to illuminate the observation region 5 of the camera 1 during the presence of a copy of the control strip 3 in that region, an illumination device 2 is provided. It is intended to output a short pulse of light at the correct instant, in order to permit an instantaneous recording of the control strip 3 by the camera 1. The illumination device 2 has a large number of individual light sources 10 in the form of light-emitting diodes (LEDs) $L_1$ to $L_9$, which are arranged equidistantly and linearly beside one another and are aimed at the observation region 5. In this case, the longitudinal direction of the line formed by the light-emitting diodes $L_1$ to $L_9$ runs parallel to the longitudinal direction of the observation region 5.

In order to focus the light emitted by the light-emitting diodes $L_1$ to $L_9$ onto the observation region 5 of the camera 1, imaging optics comprising two cylindrical lenses 11A and 11B are provided, it being possible for the number of cylindrical lenses following one another in the beam path to be varied as required.

Between the light-emitting diodes $L_1$ to $L_9$ and the imaging optics 11A, 11B, there is a filter arrangement 12 for adapting the spectral composition of the light shone onto the control strip 3 to the applicable standards for the intended measurements. The light-emitting diodes $L_1$ to $L_9$ are carried by a printed circuit board 13, on which the associated drive electronics are also accommodated.

As FIG. 1 shows, each of the illumination devices 2, 102 and 202 is each assigned to a camera 1, 101 and 201, so that each camera 1, 101 and 201 with its associated illumination devices 2, 102 and 202 forms an image recording module 0, 100 and 200 in each case. Here, the observation regions 5, 105 and 205 of the cameras 1, 101 and 201 adjoin one another without any gaps or overlap slightly, so that overall a coherent observation region 5, 105, 205 with about three times the length of each individual one of the observation regions 5, 105 and 205 is produced.

In the case of an illumination device 2 of the type illustrated in FIG. 1, which comprises a large number of individual light sources 10, the intensity of the light shone in may not be completely homogeneous along the control strip 3. For example, the optical efficiency of the light sources 10 can fluctuate among one another, which results in local increases or reductions in the light intensity. This applies in principle even if the light sources 10 all emit broadband white light, although for a color measurement on the control strip 3 a color image sensor 7 or a color camera constructed in another way with a plurality of image sensors is assumed.

However, this applies to an increased extent when light-emitting diodes $L_1$ to $L_9$ of different colors are used as the light sources 10 and color information is obtained by means of a black and white image sensor 7 by means of illumination with different colored lights changing periodically over time. In this case, the light-emitting diodes $L_1$ to $L_9$ should form a regular pattern of emission colors, for example a periodic sequence red-green-blue-red-green- . . . and so on, so that between each two light-emitting diodes of the same color there is always a plurality of another color. If always only light-emitting diodes of the same color are switched on simultaneously, then the spacing of two light-emitting diodes that is effective for the illumination is a multiple of the grid spacing of the light-emitting diodes $L_1$ to $L_9$, so the local deviations of the emitted light intensity between the light-emitting diodes of the same color have a greater effect because of the necessarily smaller overlap of the cone of radiation.

A certain inhomogeneity of the light intensity along the measuring strip 3 is also unavoidable when other types of light sources are used. For example, the intensity of the light emission from gas discharge lamps is never quite homogeneous over the length of the discharge path. In addition, in the case of this type of light source arrangement, a certain reduction in the intensity at the edges of the illumination region is to be expected. The usefulness of the method according to the invention is to this extent in no way restricted to linear arrangements of light-emitting diodes. Otherwise, there can also be inhomogeneity of the sensitivity of a camera 1 over the length of its observation region 5, or the sensitivities of the individual cameras 1, 101 and 201 of a multi-camera arrangement of the type illustrated in FIG. 1 can vary among one another. In the case of such a multi-camera arrangement, furthermore, a certain irregularity of the light intensity in the boundary region between two mutually adjacent observation regions 5 and 105 or 105 and 205 is also to be expected, since the transition of two adjacent illumination devices 2 and 102 or 102 and 202 can never be configured so as to be perfectly seamless.

According to the invention, in order to achieve a constant system sensitivity over the length of the entire observation region 5, 105, 205, at the start of the operation of the measuring apparatus, an image of an unprinted region of the printing material of the size of the observation region 5, 105, 205 is recorded and stored in a memory. This image therefore reproduces the light reflection of the unprinted printing material pixel by pixel for a region of the size of the observation region 5, 105, 205, in which systematic errors such as a variation of the intensity of the light shone in and sensitivity fluctuations of the cameras 1, 101 and 201 are expressed. Instead of recording an unprinted region of the printing material, a uniformly bright area of an object, for example a white tile, may be brought briefly to the location of the printing material to serve as a white reference.

Figure 2:
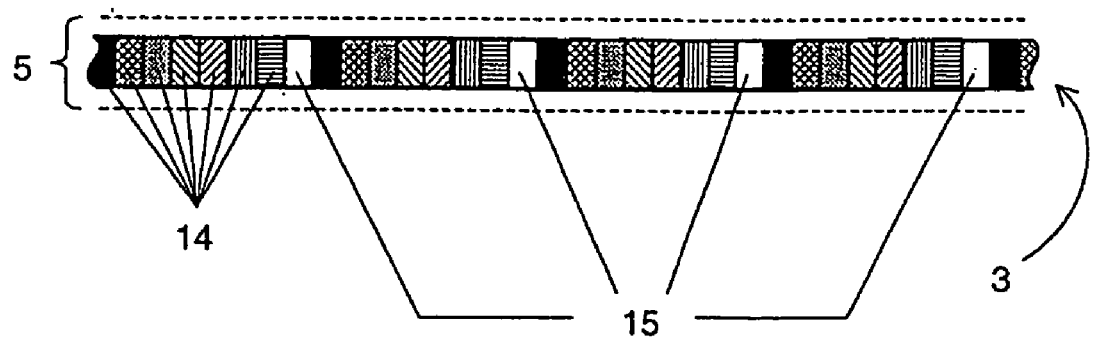
FIG. 2 shows a schematic illustration of a colored measuring strip on a printed product.

During the operation of the measuring apparatus, upon each occurrence of a copy of the control strip 3 in the observation region 5, 105, 205 of the camera arrangement 1, 101, 201, an image of the control strip 3 is recorded and evaluated. FIG. 2 shows an exemplary schematic illustration of such a control strip 3. The control strip 3 runs transversely with respect to the transport direction 6 of the printed product in the press and, in its longitudinal direction, contains a periodic sequence of individual rectangular measuring areas 14. The measuring areas 14 are printed with different test patterns, which are in each case designed for the determination of a specific characteristic variable by measurement. Typical examples of such test patterns are full-tone prints in the primary colors cyan, magenta, yellow and black for determining the respective ink densities. Furthermore, for example, halftone prints in the primary colors can also be provided as a test pattern for determining half-tone values and color register marks. The detailed configuration of the measuring areas depends on the press whose printing quality is to be optimized and monitored with the aid of the control strip 3.

In the example shown, the pattern sequence is repeated periodically along the control strip 3, in order to permit a locally resolved measurement over the entire width of the printing material, which is useful in particular for evaluating the local distribution of the ink feed points over the width of the printing material in the linking unit of a press. Thus, in the example shown in FIG. 2, seven different printed areas 14 are arranged beside one another, repeating at regular intervals. The individual groups of these seven areas 14 are in each case separated by an unprinted, i.e., white, area 15. As will be explained further, this white area 15 is used to correct the white reference for the evaluation of the intensity values of the reflected light measured on the remaining seven areas 14.

In relation to FIG. 2 it should also be noted that the hatched patterns illustrated there in the measuring areas 14 do not represent the test patterns actually printed but are merely intended to illustrate the distinction between the individual patterns. The longitudinal edges of the observation region 5 of the camera 1, in which the section of the control strip 3 shown is currently located, are marked by dashed lines. The individual measuring areas in 14 do not necessarily have to have the same width in the longitudinal direction of the measuring strip 3, although this is preferred. In principle, a specific print control strip does not have to be used at all, but it would be possible for strip-like regions of the subject, that is to say of the actual useful region of the printing material, themselves to be measured in each case as suitable measuring areas previously defined areas to be evaluated.

During the evaluation of a recorded image in continuous measurement operation, following the identification of the individual measuring areas 14 within a recorded image, averaging over the intensity values of all the pixels of the image of each measuring area 14 is carried out. This is done since no local resolution is usually necessary within the individual measuring areas 14 of the measuring strip 3. Instead, each individual measuring area 14 is used merely to determine one or more characteristic variables which are assigned as a whole to the corresponding measuring area 14. By means of this averaging, the signal/noise ratio of the measurement can be improved effectively.

Accordingly, following the identification of the position of the measuring areas 14, including the image of an unprinted region of the printing material recorded at the start of the measurement operation, an intensity average is calculated for each pixel region corresponding locally to one of the measuring areas of 14. This average is assigned to the respective measuring area of 14 as a basic reference data value and is stored. This basic reference data value is the intensity of the light reflection which would be expected at the location of the respective measuring area in the absence of printing ink, on the basis of the image of an unprinted region recorded at the start of the measurement operation.

If it could be assumed that the inhomogeneities of the illumination and of the camera sensitivity were constant over time, then the basic reference data determined as described could be used unchanged as white references for the individual measuring areas 14 and, for example, in order to calculate the intensity, they could be set into a relationship with the intensities recorded and averaged on the color measuring areas 14.

In the event of time variations of the aforesaid inhomogeneities, however, this would lead to considerable measurement errors. Such time variations always occur in practice. In addition to the unavoidable random fluctuations of the light yield during the pulsed operation of light sources, the causes of the time variations may include, for example, temperature fluctuations and temperature gradients, to which the entire measuring apparatus can be subjected, and random faults such as excessive drift phenomena or total failures of individual components and point-by-point contamination of optical system components.

On account of the aforementioned causes, it is to be expected that not all the measuring points 14 are affected to the same extent by the aforesaid time variations, but that there are locally different changes in the inhomogeneities, so that the reflected intensity of the unprinted printing material can increase in an unpredictable way in the region of some measuring areas 14 along the control strip 3 and decrease in the region of others. The way in which the present invention permits locally different time variations of the white reference to be taken into account and corrected with high accuracy is explained below with reference to FIG. 3.

Figure 3:
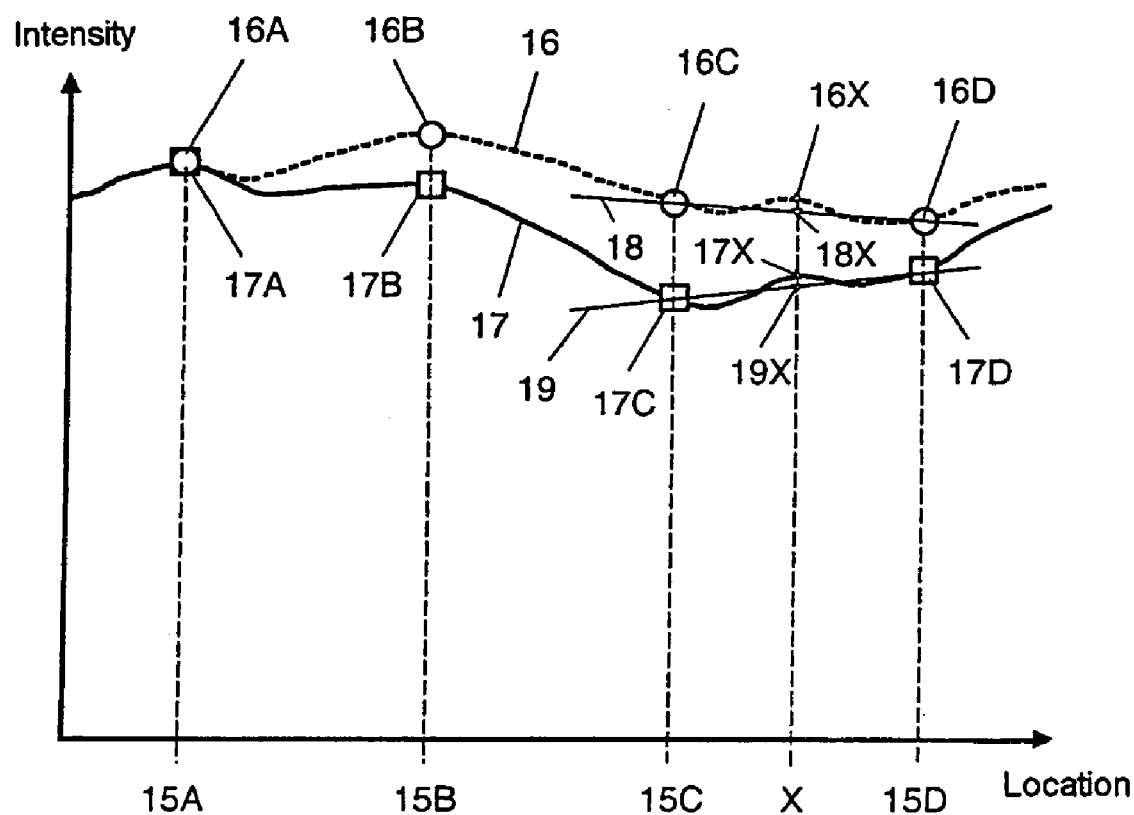
FIG. 3 shows a measured intensity profile and one corrected in accordance with the invention of the reflection of light from an unprinted printing material.

In FIG. 3, the upper curve 16 represents an example of the profile of the white basic reference data against location along the observation region 5 of a camera 1. This profile was recorded on an unprinted region of the printing material at the start of the measurement operation. The points marked with circles 16A to 16D are located at locations at which white measuring areas 15 were identified during later image recordings. These locations are identified on the abscissa by 15A to 15D. On the curve 16, the individual pixels of associated intensity values are not of interest but, as previously explained, averaging is carried out over regions each corresponding to a measuring area 14, including the sections lying between the white measuring areas 15. Accordingly, the curve 16 is a sequence of individual points, each of which is associated with a location of a measuring area 14. Thus, the curve 16 is a simplified representation of an actually locally discrete function. However, it should be emphasized that the method according to the invention can in principle also be applied to a pixel-accurate intensity profile.

The points 17A to 17C marked by squares on the lower curve 17 are intensity averages, as were determined during image acquisition in continuous measurement operation by using the white measuring fields 15. As can be seen from FIG. 3, the points 16A and 17A still coincide, while the points 16B to 16D and the respectively associated points 17B to 17D lie differently far from one another. This means that the inhomogeneity of the illumination and/or of the camera sensitivity has changed since the start of the measurement operation, and the changes are not uniform along the observation region 5 but are locally different. Now, although the changes are known accurately for the locations of the white measuring areas 15, for the purpose of evaluation they are needed for the locations of the measuring areas 14 located in between and printed in color. In other words, what is needed is a curve 17 which describes the new profile of the reference data of white reflectance in the region of the measuring areas 14 as accurately as possible.

In order to correct the basic reference data 16 between the locations of the white measuring areas 15 and to arrive at new reference data 17, the course of the two curves or data sets 16 and 17 is approximated by means of suitable interpolation functions, using the known points 16A to 16D and, respectively, 17A to 17D. For this purpose, numerical mathematics, in particular polynomials of low order, are suitable as interpolation functions. The simplest possibility, which consists in the respective approximation of the two curves 16 and 17 by a series of straight line sections, will be explained in the following text.

In FIG. 3, a section of a first straight line 18 which runs through the points 16C and 16D is shown. Likewise, a section of a second straight line 19 which runs through the points 17C and 17D is shown. By using the points 16C and 16D and, respectively, 17C and 17D, the describing equations of these two straight lines 18 and 19 are calculated. Then, at any desired location X between the locations 15C and 15D, in order to correct the basic reference data 16 determined at the start to form currently valid reference data 17, for each location X of interest the ratio of the function values of the two straight lines 19 and 18 at that location, i.e., the ratio of the intensity values associated with the points 19X and 18X, is calculated. Specifically, the intensity at the point 19X is divided by that at the point 18X. The reference data value at the point 17X is then calculated by multiplying the basic reference data value at the point 16X by this ratio.

The ratio calculation of the interpolation functions 18 and 19, and also the multiplication of the basic reference data values 16 by these ratio values, is carried out for all the locations X lying between the locations 15C and 15D to each of which a measuring area 14 is assigned, in order to obtain for all of these locations reference data values 17, which are subsequently needed to evaluate the intensity values acquired on the measuring areas 14.

This method is based on the assumption that, in spite of locally different changes in the inhomogeneities of the measuring apparatus, the basic form of its local course between the reference points 15C and 15D has been at least approximately maintained. Therefore, as a result of applying this method, the result for the curve 17 is a very similar form as compared with the curve 16 between the points 15C and 15D, as is clearly expressed in FIG. 3. The application of this method, also envisaged according to the invention, to all the image sections located between adjacent pairs of reference points, that is to say in the example of FIG. 3 also to the sections between the locations 15A and 15B, and between the locations 15B and 15C, also leads logically overall to a curve shape of the calculated reference data 17 which resembles that of the basic reference data 16. Thus, for example, an intensity drop in the basic reference data 16, as is to be expected at the two ends in the case of an illumination device 2 of the type explained previously by using FIG. 1, will always also be reflected in the current reference data 17.

By means of selecting polynomials of higher order as approximation functions, for example cubic splines, the accuracy can be increased further as compared with the linear approximation described previously. In this case, a noticeable gain in accuracy is to be expected, substantially as a result of an approximation of higher order, when a large local variation occurs which, in the case of the linear approximation, leads to large differences in the slope of the straight lines between adjacent interpolation sections. Mostly, however, a linear approximation already supplies satisfactory results.

A large local variation results in particular when a light source 10 has failed totally. As a result of the application of the method according to the invention, even such a total failure can still be coped with, as long as it remains ensured that the cones of light from the individual light sources 10 overlap to such an extent that, even with the failure of a light source, each point of the entire observation region 5, 105, 205 is still illuminated directly by at least one of the light sources 10 during each image recording. Otherwise, in this case, if a local variation which exceeds a predetermined extent is determined, a signal is given to the operating personnel of the press that a relatively large malfunction has occurred, which should be rectified as soon as possible. This is because a lower accuracy is to be expected in both the reference data 17 and the intensities recorded on the current measuring areas 14, and thus also in the useful data determined by the combination of the two, for example ink densities of the printing inks.

If a measuring apparatus of the type used as a basis here is to be employed for inline ink density measurements within the context of regulating the ink supply in the inking unit of a press, then in the event of a functional fault with a persistent considerable change in the white reference profile, this is a threat of a potentially costly premature breakdown of the printing process. With the present invention, however, this can still be avoided and emergency operations maintained in many cases. In the case of temporary, slight changes, the invention ensures high accuracy of the white reference profile and therefore of the useful data determined when it is used.

Finally, it should be pointed out once again that the invention can in principle be applied just as well to a two-dimensional test pattern as to an elongated, narrow control strip having a one-dimensional sequence of measuring areas as in the exemplary embodiment, described previously. In this case, two-dimensional interpolation with correspondingly more complex approximation functions would be necessary. The illustration of the exemplary embodiment is to this extent not to be understood as restricting the scope of the invention to the one-dimensional case.

What is claimed is:

1. A method of evaluating an image of a predetermined extract of a printed product, comprising: using a processor to perform,
    recording an image of a white reference using a camera for acquiring images of the predetermined extract;
    deriving basic reference data only once, at the outset of a print job before color is applied to the printing material, for evaluating the extract from intensity signals of the image of the white reference;
    during each subsequent evaluation of an image of the extract acquired by the camera, deriving correction data from predetermined reference areas within the extract;
    generating a set of corrected reference data based on the basic reference data and the correction data by:
    calculating a first interpolation function for the basic reference data and a second interpolation function for the correction data;
    for a given location in the extract, determining a ratio of the second interpolation function over the first interpolation function for said given location; and
    multiplying a value of the basic reference data for the given location with the ratio to generate a value for corrected reference data for said given location; and
    combining intensity signals recorded from predetermined measuring areas with the corrected reference data to provide corrected intensity signals for the predetermined measuring areas.

2. A method as in claim 1, wherein the white reference is an unprinted region of the printed product.

3. A method as in claim 1, wherein the white reference is a white surface of an object temporarily introduced into an observation area of the camera.

4. A method as in claim 1, wherein the basic reference data are intensity averages, each intensity average being calculated for each area of the predetermined reference areas and measuring areas in the predetermined extract and being assigned to said each area as a basic reference data value.

5. A method as in claim 1, wherein the correction data are intensity averages each being calculated from each of the predetermined reference areas and being assigned to said each predetermined reference area as a correction data value.

6. A method as in claim 1, wherein the predetermined reference areas and measuring areas are arranged continuously beside on another to form a strip.

7. A method as in claim 1, wherein the predetermined reference areas are arranged with the extract within a regular pattern.

8. A method as in claim 1, wherein the first and second interpolation functions are linear functions.

9. A method as in claim 1, wherein the first and second interpolation functions are polynomials of up to the third order.

10. A method as in claim 1, further including a step of generating an error message when a pre-selected deviation between the basic reference data and the corrected reference data is exceeded.

11. A method as in claim 1, further including calculating ink density values for the measuring areas from the corrected intensity signals.

* * * * *